Nov. 5, 1963 H. T. WINCHEL 3,109,964

TIMING CIRCUIT

Filed Aug. 4, 1959

INVENTOR:
Henry T. Winchel

By Smyth & Roston

Attorneys,

United States Patent Office 3,109,964

Patented Nov. 5, 1963

3,109,964

TIMING CIRCUIT

Henry T. Winchel, Culver City, Calif., assignor to Consolidated Electronics Industries Corp., New York, N.Y., a corporation of Delaware Filed Aug. 4, 1959, Ser. No. 831,536

8 Claims. (Cl. 317—148.5)

This invention relates to apparatus for providing a controlled timing between the occurrence of first and second events. More particularly, the invention relates to electronic circuitry which requires no moving parts to provide a precise control as to the passage of a particular period of time, when the period of time is relatively small. The invention is also concerned with electronic circuitry which can be used in conjunction with the circuitry described above to indicate an interruption in the supply of voltage to the above electrical circuitry for a particular time after the occurrence of the second event.

In many types of situations, a precise control over the passage of a particular period of time must be provided. For example, in process control systems it may be desirable or even necessary to control with precision the amounts of different materials introduced to a system to obtain a desired result. Circuits have been devised which are capable of providing measurements as to time for relatively long periods of time. However, it has been more difficult to produce circuits which are capable of measuring time with considerable precision when the time has been relatively short, such as in the order of seconds or milli-seconds.

This invention provides circuitry which uses no moving parts and yet is able to measure with considerable accuracy a particular period of time in the order of seconds or milli-seconds. The invention provides such a precise measurement of time even while using a minimum number of components in comparison to the number of components which have previously been required. The invention also measures the particular period of time with increased accuracies in comparison to that provided by circuits previously in use.

The invention includes a voltage source, a first resistance and a capacitance connected in a circuit arrangement to provide a charging of the capacitance to a particular voltage in a period of time dependent upon the values of the resistance and the capacitance. The invention further includes a single member such as a particular type of semi-conductor, this semi-conductor being designated as a "uni-junction transistor." The uni-junction transistor is connected to the voltage source and to the capacitance to become conductive upon the occurrence of the particular voltage across the capacitance.

When the uni-junction transistor becomes conductive, the impedance presented by the transistor decreases from a relatively high value in the order of several million ohms to a relatively low value in the order of several ohms. Because of this, the capacitance is able to discharge with a large current through the semi-conductor and through a control member such as a relay which is connected to the semi-conductor.

By providing the uni-junction transistor, the number of components in the timing circuit is reduced since the uni-junction transistor replaces at least two resistors. Furthermore, increased accuracies in timing are obtained because of the initial occurrence of a state of non-conductivity in the uni-junction transistor and because of the high impedance provided in the uni-junction transistor before the discharge of the capacitance through the uni-junction transistor.

The invention also includes circuitry which operates in conjunction with the timing circuitry described above to indicate an interruption in power for a particular period of time after the discharge of the capacitance through the control means such as the relay. The timing circuit for providing such an indication may include a second relay connected in a timing circuit with a resistance and a capacitance. The capacitance is charged during the production of power and discharges through the resistance after the interruption of power. If the interruption of power is sufficiently long, the capacitance discharges to such an extent that a relatively heavy current is able to flow through the capacitance and the second relay when the voltage from the source is restored. The flow of current through the second relay prepares the circuitry constituting this invention for a subsequent charging of the capacitance.

Other advantages of this invention will become apparent from a detailed description of the invention in connection with the drawings in which.

Figure 1:
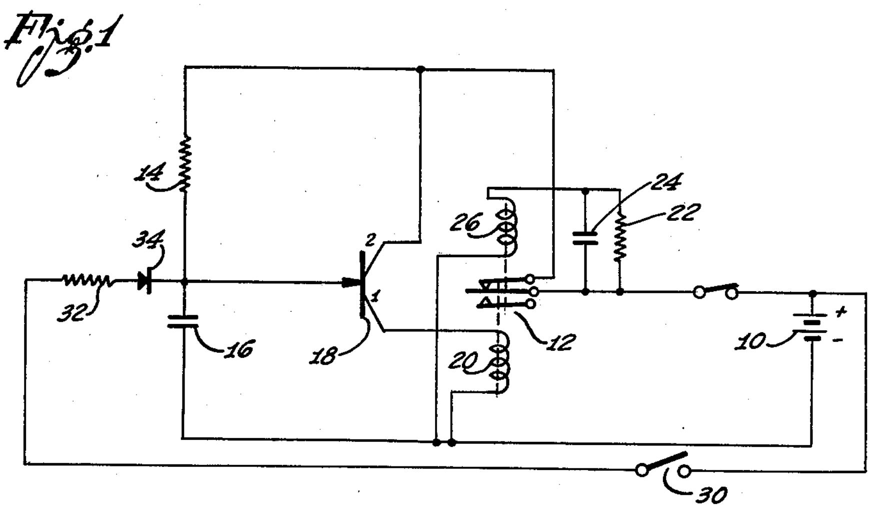
FIGURE 1 is a circuit diagram of one embodiment of the invention.

In FIGURE 1, a source 10 of direct voltage may be provided. The voltage source 10 may be a battery or may be any other circuit which is capable of providing a direct voltage. The potential provided by the source 10 may be in the order of 28 volts. The positive terminal of the source 10 is connected to the movable arm of a single-pole double-throw switch 12. The switch 12 may be constructed so that the movable arm of the switch will engage either one of the stationary contacts in the switch until the movable arm is actuated into engagement with the other stationary contact.

The upper stationary contact of the switch 12 in FIGURE 1 is connected to one terminal of a resistance 14, which may have a suitable value such as 200 kilo-ohms. The resistance 14 may be included in a timing circuit with a capacitance 16, which may have a suitable value such as 60 microfarads. As shown in FIGURE 1, the resistance 14 and the capacitance 16 are in series across the source 10 when the movable arm of the switch 12 engages the upper stationary contact of the switch in FIGURE 1.

A semi-conductor 18, designated as a "uni-junction transistor" is connected in a circuit between the upper stationary contact of the switch 12 in FIGURE 1 and the negative terminal of the voltage source 10. The uni-junction transistor 18 may be obtained from the General Electric Company and may be designated by the type Nos. 2N489 to 2N494, inclusive, depending upon the characteristics desired for the uni-junction transistor.

The uni-junction transistor 18 is provided with three terminals which may be respectively designated as the emitter, base 1 and base 2. The emitter of the uni-junction transistor is connected to the common terminal between the resistance 14 and the capacitance 16. The base 2 of the uni-junction transistor 18 has a common connection with the upper stationary contact of the switch 12 in FIGURE 1, and the base 1 of the uni-junction transistor has a common connection with one terminal of a relay 20. The second terminal of the relay 20 is connected to the negative terminal of the voltage source 10. The relay 20 is magnetically coupled to the movable arm of the switch 12 to actuate the movable arm into engagement with the lower stationary contact of the switch in FIGURE 1.

The first terminals of a resistance 22 and a capacitance 24 are connected to the positive terminal of the voltage source 10. The resistance 22 and the capacitance 24 may be respectively provided with suitable values such as 100 kilo-ohms and 10 microfarads. A relay winding 26 is connected at one end to the second terminals of the resistance 22 and the capacitance 24 and at the other end to the negative terminal of the voltage source 10. The relay 26 is magnetically coupled to the movable arm of the switch 12 to actuate the switch into engagement with the upper stationary contact of the switch in FIGURE 1.

The positive terminal of the voltage source 10 is also connected to the stationary contact of a single-pole single-throw switch 30 having its movable arm connected to one terminal of a resistance 32. The resistance 32 may be provided with a suitable value such as 1 kilo-ohm. The anode of a diode 34 is connected to the second terminal of the resistance 32, and the cathode of the diode is connected to the common terminal between the resistance 14 and the capacitance 16. The diode 34 may be a silicon diode such as a type 1N461 manufactured by the Hughes Aircraft Company.

When the movable arm of the switch 12 engages the upper stationary contact of the switch in FIGURE 1, current flows through a circuit including the voltage source 10, the movable arm and upper stationary contact of the switch 12, the resistance 14 and the capacitance 16. This current charges the capacitance 16 at a rate dependent upon the potential from the source 10 and upon the values of the resistance 14 and the capacitance 16. For example, the capacitance 16 becomes charged at an increased rate when the value of the resistance 14 or of the capacitance 16 or of both components is reduced. The rate of charging the capacitance 16 is related to the product of the values of the resistance 14 and the capacitance 16, this product being designated as the "RC" time constant.

The uni-junction transistor 18 is non-conductive during the period of time in which the capacitance 16 is becoming initially charged. During this time, the impedance between the emitter and the base 1 of the uni-junction transistor 18 is quite high such as in the order of several million ohms. The impedance between the base 2 and base 1 of the transistor is also somewhat high such as in the order of 10 kilo-ohms. The impedances between the emitter and the base 1 of the transistor 18 and between the base 1 and the base 2 of the transistor 18 are respectively illustrated schematically at 40 and 42 in FIGURE 2.

When the capacitance 16 becomes charged to a particular value, the potential on the emitter of the uni-junction transistor 18 exceeds the potential on the base 1 of the transistor. Since the emitter and the base 1 of the transistor in effect operate in a manner equivalent to the anode and cathode of a diode, current flows between the emitter and the base 1 of the transistor. The equivalent diode in the uni-junction transistor 18 is illustrated at 44 in FIGURE 2.

Figure 2:
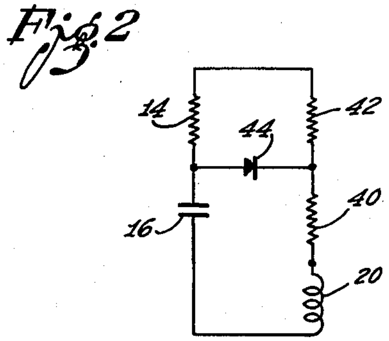
FIGURE 2 is a schematic diagram of electrical circuitry which illustrates certain features shown in FIGURE 2 on an equivalent electrical basis.

Upon the initiation of a current flow between the emitter an the base 1 of the uni-junction transistor 18, the impedance between these elements decreases to a relatively low value in the order of several ohms, this impedance being illustrated at 40 in FIGURE 2. This causes the capacitance 16 to discharge at a rapid rate through a circuit including the capacitance, the emitter and the base 1 of the uni-junction transistor 18 and the relay 20. The capacitance discharges with a large current through this circuit because of the low impedance provided by the uni-junction transistor 18 and the relay 20. The current is sufficiently large to energize the relay 20 so that the relay actuates the movable arm of the switch 12 into engagement with the lower stationary contact of the switch in FIGURE 1.

Because of the actuation of the movable arm of the switch 12, the voltage from the source 10 is no longer applied to the resistance 14 and the capacitance 16. This prevents the capacitance 16 from again becoming charged until the movable arm of the switch 12 is actuated into engagement with the upper stationary contact of the switch in FIGURE 1. The switch 12 is constructed so that the movable arm of the switch remains in engagement with the lower stationary contact of the switch in FIGURE 1 until the relay 26 becomes energized. However, the relay 26 cannot become energized during the time that the potential from the source 10 is applied to the resistance 22 and the capacitance 24. This results from the fact that the capacitance 24 has previously become fully charged so as to prevent current from flowing through a circuit including the capacitance and the relay 26.

Upon an interruption in the voltage from the source 10, the capacitance 24 discharges through the resistance 22. If the potential from the source 10 remains interrupted for at least a particular period of time, the capacitance 24 becomes sufficiently discharged so as to receive a relatively large current when the potential from the source 10 becomes applied again to the capacitance. Since the charging current flowing through the capacitance 24 also flows through the relay 26, the relay actuates the movable arm of the switch 12 into engagement with the upper stationary contact of the switch in FIGURE 1. As will be seen, the current flowing through the relay 26 has a sufficiently high value to actuate the movable arm of the switch 12 only when the capacitance 24 has discharged through the resistance 22 for at least the particular period of time. This particular period of time is dependent upon the values of the capacitance 24 and the resistance 22.

At certain times, it may be desirable to energize the relay 20 on an instantaneous basis. For example, if the timing circuit shown in FIGURE 1 is used to control the cutting tool, it may be desirable to energize the relay 20 instantaneously in case the cutting tool breaks or vibrates excessively. This is accomplished by closing the switch 30. The switch 30 may be closed manually or can be coupled mechanically to the cutting tool so as to close when something goes wrong with the cutting tool.

When the switch 30 becomes closed, current flows through a circuit including the voltage source 10, the resistance 32, the diode 34 and the capacitance 16. This current is relatively large since the impedances provided by the resistance 32 and the diode 34 are quite small. Because of this, the capacitance 16 becomes quickly charged to the particular value for producing a flow of current between the emitter and the base 1 of the uni-junction transistor. This causes the capacitance 16 to discharge through the relay 20 in a manner similar to that described above.

The timing circuit described above and shown in FIGURE 1 has certain important advantages. For example, it provides increased precision in indicating a particular period of time because of the inclusion of the uni-junction transistor 18. This results from the operation of the transistor 18 in providing a high impedance for the equivalent of the resistance 40 during states of non-conductivity and in providing a low impedance for the equivalent of the resistance 40 upon becoming conductive. It also results from the high impedance provided by the operation of the transistor 18 as the equivalent of the diode 44 during periods of non-conductivity of the transistor.

Because of the high impedance during periods of non-conductivity, any current flow through the relay 20 is inhibited. However, the capacitance 16 is able to discharge through the relay 20 without any impediment from the uni-junction transistor 18 when the transistor become conductive. The use of the transistor 18 also produces a decrease in the number of components relative to the number used in previously available circuits. This results from the fact that the transistor 18 provides functions equivalent to the resistances 40 and 42 and the diode 44 in FIGURE 2 and actually provides enhanced operations because of the drop in impedance of the resistance 40 after the transistor becomes conductive.

The invention described above and shown in FIGURE 1 also has other advantages. By way of illustration, it indicates whether the potential from the source has become interrupted for a particular period of time. When such an interruption occurs, the invention prepares the circuit including the capacitance 16 so as to obtain a new charge of the capacitance. The invention is also advantageous in producing an instantaneous charge of the capacitance 16 at particular times to a level for obtaining an energizing of the relay 20.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. Timing circuitry, including a source of voltage, a first resistance, a capacitance coupled electrically in series with the voltage source and the first resistance to become charged to a particular value in a time dependent upon the values of the capacitance and the first resistance, a single member providing second and third resistances in a series relationship during periods of non-conductivity in the member and providing a reduced value for the second resistance upon a state of conductivity in the member, the single member being connected to the voltage source and to the first resistance and to the capacitance and in parallel with the capacitance and the first resistance to obtain a state of conductivity in the member upon the charging of the capacitance to the particular value and to obtain a discharge of the capacitance through the member upon a state of conductivity in the member, means coupled to the single member for providing an output indication upon the discharge of the capacitance through the single member, and means coupled to the capacitance for by-passing the first resistance to charge the capacitance quickly to the particular value.

2. Timing circuitry, including, a first resistance, a voltage source, a capacitance connected in a series circuit with the first resistance and the voltage source, a semi-conductor having first, second and third terminals, the first and third terminals of the semi-conductor being connected across the series arrangement of the resistance and the capacitance and the second terminal of the semi-conductor being connected to the terminal common to the resistance and the capacitance, first relay means connected between the third terminal of the semi-conductor and the voltage source for obtaining an energizing of the first relay means upon a charge of the capacitance to a particular value, switching means coupled to the first relay means for actuation in accordance with the energizing of the first relay means, and means including second relay means coupled to the switching means and responsive to an interruption in the voltage from the voltage source for a particular period of time and to a subsequent introduction of voltage from the source to obtain an energizing of the switching means.

3. Timing circuitry, including a first resistance, a voltage source, a capacitance connected in a circuit with the first resistance and the voltage source to obtain a charging of the capacitance at a rate dependent upon the values of the resistance and the first capacitance, a semi-conductor connected to the voltage source and to the capacitance to obtain a discharge of the capacitance through the semi-conductor upon the occurrence in the capacitance of a particular charge dependent upon the characteristics of the semi-conductor, switching means having first and second states of operation, first relay means coupled to the semi-conductor for obtaining an energizing of the first relay means upon the discharge of the capacitance through the semi-conductor and coupled to the switching means for actuating the switching means to the first state of operation upon the energizing of the first relay means, and second relay means responsive to the voltage from the voltage source and coupled to the switching means for actuating the switching means to the second state of operation upon an interruption in the voltage from the source for a particular period of time and upon a subsequent introduction of voltage from the source.

4. Timing circuitry, including, a first resistance, a voltage source, a first capacitance connected in a series circuit with the first resistance and the voltage source to obtain a charging of the capacitance at a rate dependent upon the values of the resistance and the first capacitance, a semi-conductor constructed to provide second and third resistances and connected to the voltage source and to the capacitance and to the first resistance and in parallel with the capacitance and the first resistance to obtain a discharge of the capacitance through the semi-conductor upon the occurrence in the capacitance of a particular charge, means including relay means coupled to the semi-conductor to become energized upon a discharge of the capacitance through the semi-conductor, and means coupled to the capacitance for introducing a voltage to the capacitance to obtain an instantaneous charge of the capacitance to the value for producing a discharge of the capacitance through the semi-conductor.

5. Timing circuitry, including, a first resistance, a source of direct voltage, a first capacitance connected in a circuit with the first resistance and the voltage source to obtain a charging of the capacitance to a particular value in a period of time dependent upon the values of the first resistance and the capacitance and the direct voltage, a single member constructed to provide second and third resistances before a state of conductivity in the single member and to provide a reduction in the value of the third resistance upon a state of conductivity in the member, the single member being connected to the voltage source and to the first resistance and the capacitance and in parallel with the first resistance and the capacitance to become conductive upon the occurrence of the particular charge in the capacitance, relay means coupled to the single member to receive the charge from the capacitance upon the production of a state of conductivity in the single member, switching means having first and second states of operation and operatively coupled to the relay means for actuation from the first state of operation to the second state of operation upon an energizing of the relay means, and second relay means operatively coupled to the switching means to obtain an actuation of the switching means from the second state of operation to the first state of operation, and control means operatively coupled to the switching means in the second state of operation and to the second relay means to prevent the energizing of the second relay means for a particular period of time after an interruption of the voltage from the source and to obtain an energizing of the second relay means upon an institution of the voltage from the source after the particular period of time.

6. The combination set forth in claim 5, in which the control means includes a fourth resistance and a second capacitance in parallel and connected in series with the second relay means and the switching means in the second state of operation of the switching means.

7. Timing circuitry, including, a source of voltage, a first resistance, a capacitance coupled electrically to the voltage source and the first resistance to become charged to a particular value in a time dependent upon the values of the capacitance and the first resistance, a single member providing second and third resistances during periods of non-conductivity in the member and providing a reduced value for the third resistance upon a state of conductivity in the member, the single member being connected to the voltage source and to the capacitance and to the first resistance to obtain a state of conductivity in the member upon the charging of the capacitance to the particular value and to obtain a discharge of the capacitance through the member upon a state of conductivity in the member, bistable means coupled to the single means and having a normal condition and an operating condition to which it is set upon the discharge of the capacitance through the single member, and means including delay means coupled to the bistable means and to the voltage source for resetting said bistable means to its normal condition after any temporary interruption of voltage from said voltage source for an interval exceeding a predetermined duration and after the introduction of voltage from the source following the predetermined duration.

8. The timing circuitry set forth in claim 7 in which the bistable means includes, a switch having normal and operating conditions and in which the delay means include a fourth resistance and a second capacitance connected in parallel and further include relay means connected in a series circuit with the voltage source and the parallel combination of the fourth resistance and the second capacitance.

References Cited in the file of this patent

UNITED STATES PATENTS

| | | |
|---|---|---|
| 2,433,254 | Aiken | Dec. 23, 1947 |
| 2,669,677 | Entwisle | Feb. 16, 1954 |
| 2,866,925 | Wunderman | Dec. 30, 1958 |
| 2,867,754 | O'Bleness | Jan. 6, 1959 |
| 2,906,926 | Bauer | Sept. 26, 1959 |
| 2,927,259 | Neal | Mar. 1, 1960 |
| 2,947,916 | Beck | Aug. 2, 1960 |